United States Patent [19]

Swander, Jr. et al.

[11] 3,977,308
[45] Aug. 31, 1976

[54] DOUBLE PISTON BRAKE ACTUATOR

[75] Inventors: Kenneth D. Swander, Jr.; Bruce D. Sibley, both of Lawrence, Kans.

[73] Assignee: Aeroquip Corporation, Jackson, Mich.

[22] Filed: Mar. 18, 1974

[21] Appl. No.: 451,916

[52] U.S. Cl. ............... 92/63; 92/130 A; 92/167; 92/169; 92/240
[51] Int. Cl.² .................. F01B 7/00
[58] Field of Search ......... 92/62, 63, 64, 130, 92/169, 240, 167, 168

[56] References Cited
UNITED STATES PATENTS

| | | | |
|---|---|---|---|
| 1,776,147 | 9/1930 | Clagett | 92/169 |
| 1,932,649 | 10/1933 | Trachsel | 188/170 X |
| 2,282,615 | 5/1942 | Spalding | 92/63 X |
| 2,846,190 | 8/1958 | Saurenman | 92/169 X |
| 3,101,814 | 8/1963 | Newell | 188/153 R X |
| 3,179,019 | 4/1965 | Cruse | 92/51 |
| 3,181,433 | 5/1965 | Cruse | 92/52 |
| 3,183,795 | 5/1965 | Kirk | 92/212 |
| 3,188,922 | 6/1965 | Cruse | 92/52 |
| 3,311,030 | 3/1967 | Halstead | 92/167 X |
| 3,396,637 | 8/1968 | Sessody | 92/240 |
| 3,401,606 | 9/1968 | Mathews et al. | 92/63 X |
| 3,415,168 | 12/1968 | Dean | 92/30 |
| 3,431,031 | 3/1969 | Ike | 92/63 X |
| 3,479,927 | 11/1969 | Woodward | 92/64 X |
| 3,523,001 | 8/1970 | Sylvester et al. | 92/240 X |
| 3,557,665 | 1/1971 | Von Lowis | 188/170 X |
| 3,557,913 | 1/1971 | Russler | 92/63 X |
| 3,576,152 | 4/1971 | Chevreux | 92/65 |
| 3,824,904 | 7/1974 | Visser | 92/168 X |
| 3,826,176 | 7/1974 | Ike | 92/63 X |
| 3,842,716 | 10/1974 | Swander, Jr. | 92/63 |

FOREIGN PATENTS OR APPLICATIONS

| | | | |
|---|---|---|---|
| 1,074,424 | 11/1954 | Germany | 92/168 |
| 1,430,546 | 12/1968 | Germany | 188/170 |
| 956,195 | 4/1964 | United Kingdom | 92/63 |
| 944,223 | 12/1963 | United Kingdom | 92/63 |

Primary Examiner—Martin P. Schwadron
Assistant Examiner—Abraham Hershkovitz
Attorney, Agent, or Firm—Thomas M. Scofield

[57] ABSTRACT

Improved brake actuators of the type having both service chamber and spring emergency-parking chambers utilizing piston in each said chamber (no diaphragms); improved double piston brake actuator wherein the service chamber is inboard of the spring emergency chamber; improved double piston brake actuator having an inboard spring emergency-parking and an outboard service chamber.

26 Claims, 15 Drawing Figures

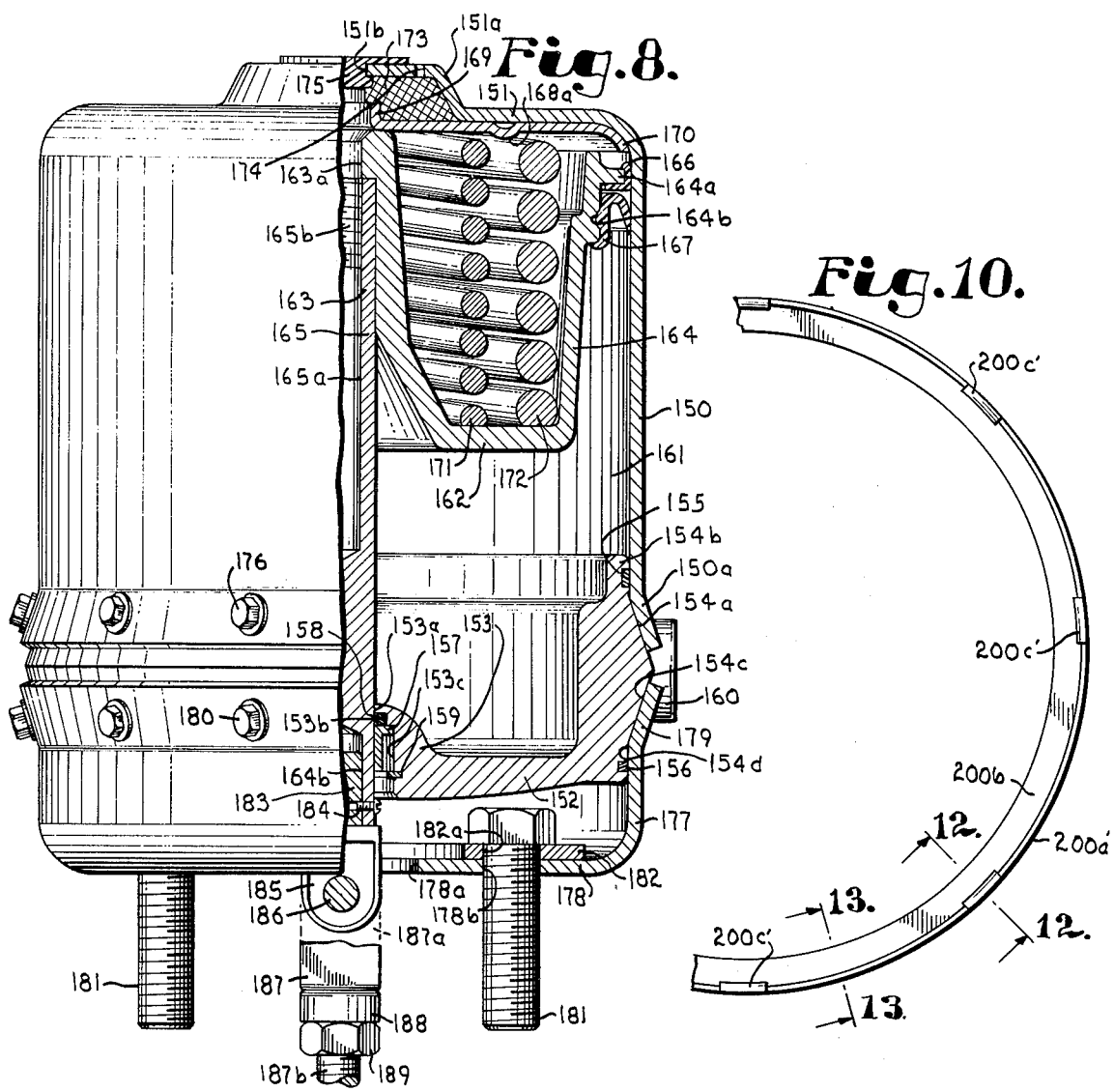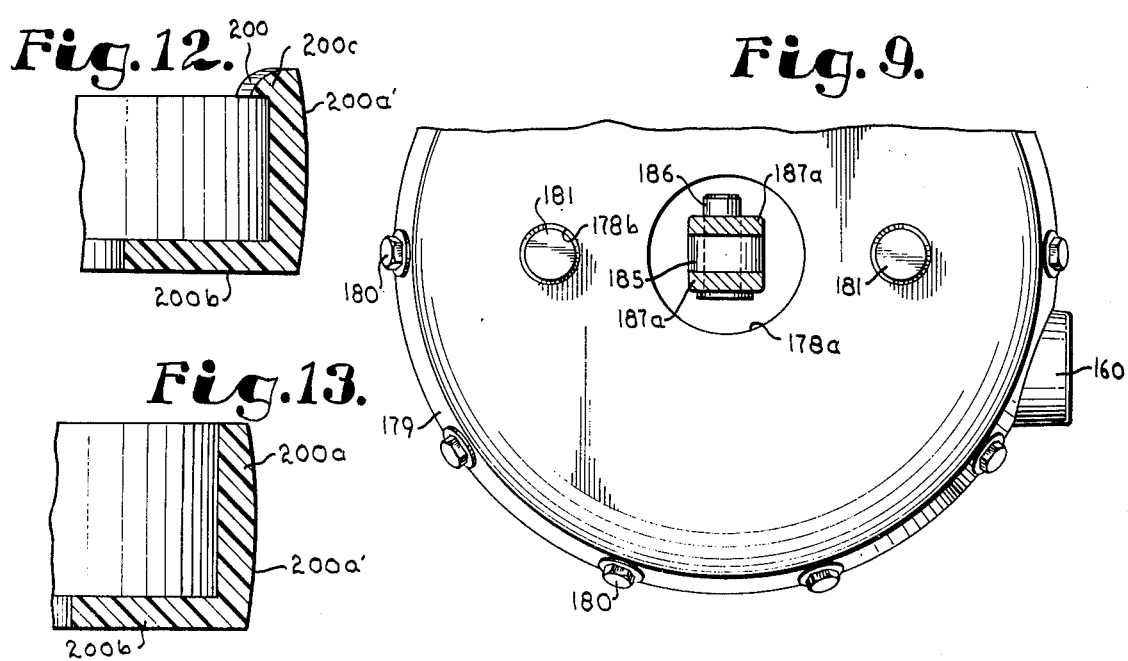

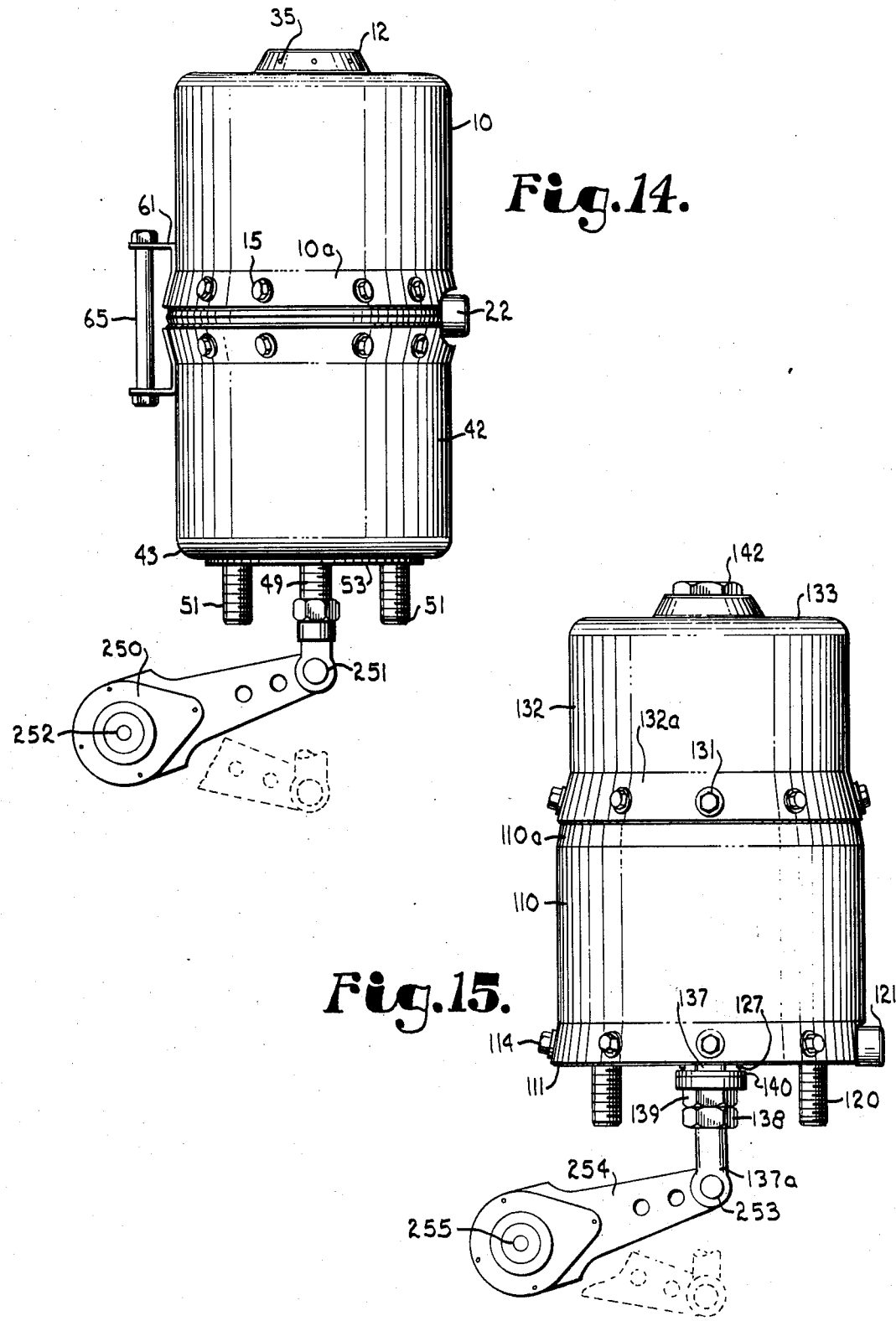

DOUBLE PISTON BRAKE ACTUATOR

OBJECTS OF THE INVENTION

An object of the invention is to provide an improved service brake chamber of piston type which may be employed in conjunction with a power spring chamber, either inboard or outboard thereof, whereby to provide an improved double piston brake actuator in either case.

An object of the instant invention is to provide improvements in a spring emergency-parking brake of the type wherein the spring emergency portion of the brake is positioned outboard (with respect to the axle) of the service portion of the brake, the improvement basically comprising utilization of a piston in the service portion of the brake, as well as the spring emergency portion thereof.

Another object of the invention is to provide improvements in a spring emergency-parking brake of the type wherein the spring emergency portion of the brake is positioned inboard (with respect to the axle) of the service portion of the brake, the improvement basically comprising utilization of pistons in both the service and spring emergency portions of the brake.

Another object of the invention is to provide an improved spring emergency-parking brake (utilizing a piston in the service portion of the brake) wherein the service portion of the brake has a markedly lesser outer diameter, thereby facilitating use of the brake actuator in limited space applications.

Another object of the invention is to provide an improved spring emergency-parking brake having piston reliability in both the emergency and service portions of the brake, as opposed to diaphragm vulnerability in one or both of them.

Another object of the invention is to provide an improved service chamber for a spring emergency-parking brake actuator which has an inherent higher pressure rating capacity for a given size than the corresponding diaphragm service chamber.

Another object of the invention is to provide a basic piston-utilizing service brake chamber which may be employed with a variety of outer end closures, thereby to permit the utilization therewith of outboard spring emergency-parking brake units of varying capacities and sizes.

Another object of the invention is to provide double piston brake actuators and service chambers associated therewith which are readily adaptable for use with heavy off-road equipment (wherein greater braking forces and longer brake strokes are typically required, beyond the practical limitations of diaphragms).

Another object of the invention is to provide improved service brake chambers utilizing pistons therein having considerably longer life than corresponding diaphragm service brake chambers, which are less expensive to manufacture and which are far more reliable over longer periods of operation without requirement of maintenance or repair.

Another object of the invention is to provide improved brake actuators having combined service and emergency-parking chambers incorporated therewithin, both sections of the actuators employing pistons, wherein diaphragm failure is completely obviated and wherein both sections of the actuator will continue to function and work despite considerable leakage around one or both of the pistons without any immediate or catastrophic failures (as is possible with diaphragms).

Another object of the invention is to provide improved, one-piece service brake chamber constructions utilizing pistons therein, same not requiring the usual multi-part construction provided for the clamping of the diaphragm bead and which further omit clamp bands, thereby to achieve the same functional result in lesser diameter constructions.

Another object of the invention is to provide improved brake actuator constructions having both spring emergency-parking and service sections, each section comprising a one-piece cylindrical can or housing, each open at one end, the housings formed with a lesser internal diameter in the direction of piston operation, whereby to maximize the piston seal in use under pressure, particularly in cold weather.

Another object of the invention is to provide an add-on, double piston brake actuator having both spring emergency-parking and service functions, each section in the brake having a one-piece cylindrical housing or can construction with a flair or taper outwardly centrally of the brake, thereby to provide effective, strong connection of the housings with the center divider and maximum sealing thereat.

Another object of the invention is to provide improved brake actuators with service and emergency-parking sections having a minimum number of parts, no diaphragms, maximum strength and construction of great simplicity wherein many more cycles of both brake chambers (utilizing pistons) may be achieved without failure.

Another object of the invention is to provide a double piston add-on brake actuator having such long life and lower maintenance requirement that there is no anticipation of having to disassemble the same. However, if desired, the outboard spring may be caged with a mechanical release and the outer (spring) emergency-parking section) cylinder removed for access to bulkhead seals. Further, the bulkhead is removable to get at the service section piston below and its seal. Still further, the piston rod attached to the spring emergency-parking section piston is readily pulled because no member is required on the end thereof that can't be pulled through the bulkhead plate.

Another object of the invention is to provide two new double piston brake actuators having service and spring emergency-parking sections wherein the stroke limitations of diaphragm type service brakes may be greatly exceeded.

Another object of the invention is to provide two new double piston brake actuators having both service and emergency-parking sections wherein the brake may always be operated and run at full stroke, which is not the case in a diaphragm brake. Additionally, these brakes will have greater life expectancy even though run at full stroke.

An object of the invention is to provide a spring brake unit having both service-emergency chambers, the service chamber outboard of the emergency chamber, movable wall piston units being employed in both service and emergency chambers as power sources acting on the brake rod.

Another object of the invention is to provide a brake unit having both service and emergency functions wherein no diaphragm is employed with respect to either the service or emergency functions.

Another object of the invention is to provide a highly improved brake unit over the patent to Frankhauser et al. U.S. Pat. No. 3,065,997, issued Nov. 27, 1962, for "Vehicle Brake Operator" yet having the same relative positioning therein of the service and emergency-parking functions.

Another object of the invention is to provide an improved brake unit having both service and emergency-parking functions with the service function outboard of the emergency function, same having a markedly lower outboard profile (markedly less outboard volume), as compared to a diaphragm unit of the same type.

Another object of the invention is to improve the construction of the Frankhauser et al., U.S. Pat. No. 3,065,997 patent in that the outboard diaphragm service chamber thereof, with a large diameter diaphragm and clamp band, is completely removed and replaced with an outboard piston construction, thereby eliminating both the large size of the diaphragm service and alignment problems with the clamp bands and all right and left hand unit problems which existed with respect to the Frankhauser et al. construction.

Another object of the invention is to provide an improved vehicle brake unit having both service and emergency-parking functions with the service function outboard, with pistons operating in both the service and emergency-parking functions, whereby to provide piston reliability as opposed to diaphragm unreliability. (Thus, in the new construction, one can have considerable leakage around the, for example, outboard (service function) piston without any immediate or catastrophic failure as might be present with an outboard service diaphragm failure of any sort.)

Another object of the invention is to provide an improved vehicle brake unit with both service and emergency-parking functions with the service function outboard, both service and emergency functions piston operated, wherein the outboard air inlet (to operate the service function) is centrally positioned in the unit, thereby to give optimum axle, tire and chassis clearance and accessability for piping.

Another object of the invention is to provide an improved vehicle brake unit having both service and emergency-parking functions with the latter located inboard, whereby it is readily feasible to provide an increased diameter (greater strength) power spring (for the emergency-parking function) chamber inboard, where the increased diameter is acceptable. With such increased inboard diameter, less pressure is required to return the given power spring load for full release, as well. (more piston area)

Another object of the invention is to provide an improved vehicle brake unit having both service and emergency-parking functions with the service function outboard, the emergency-parking functions inboard, wherein the double power spring concept of Frankhauser, U.S. Pat. No. 3,065,997, is more readily achievable because greater inward diameter of the housing or cylinder of the brake unit is readily provideable.

Another object of the invention is to improve the cylinder design with respect to draft and flare on the inboard emergency-parking portion of a vehicle brake having both service (outboard) and emergency-parking (inboard) functions, the inboard emergency-parking function portion of the housing having, in section, a reverse profile from customary, whereby there is tighter sealing as the inboard piston moves in the outboard direction.

Another object of the invention is to provide an improved vehicle brake unit having both service and emergency-parking functions with the former outboard having an inherent higher pressure rating capacity (as compared to a comparable size diaphragm unit), because the limits inherent with respect to diaphragms in either service or emergency-parking functions are totally removed.

Another object of the invention is to provide an improved type of vehicle brake unit having both service and emergency-parking functions with the former outboard, same having far longer life and lower maintenance requirements than are provided by the Frankhauser, U.S. Pat. No. 3,065,997, construction, wherein the necessity for disassembly of the unit is far less. (The piston packing cup, bearings and seals last far longer than any diaphragm.)

Another object of the invention is to provide an improved vehicle brake unit with both service and emergency-parking functions, with the former outboard, wherein there is provideable an exceedingly effective mechanical release feature without the necessity of perforating a diaphragm to obtain the same function as in the Frankhouser type device.

Another object of the invention is to provide an improved vehicle brake unit having an outboard service function with, additionally, inboard emergency-parking function, wherein the stroke limitations of diaphragm type service brake units are entirely left behind and wherein the unit may be operated at full stroke without penalty to the life of the service chamber piston as it was in the case of the old service chamber diaphragm. (full chamber stroke in all cases)

Other and further objects of the invention will appear in the course of the following description thereof.

DESCRIPTION OF THE DRAWINGS

Referring to the drawings, in which embodiments of the invention are shown, like numerals are employed to indicate like parts in the various views.

FIG. 8 is a side, partly sectional view of a power spring brake actuator utilizing an improved piston and seal construction therein.

FIG. 9 is a fragmentary lower end view of the brake actuator of FIG. 8 (looking upwardly in the view of FIG. 8).

FIG. 10 is a plan view of the piston bearing employed with the double pistons in FIGS. 1 and 7 in conjunction with the packing cups also used therewithin. Such piston bearing is also used on the single piston of FIG. 8 in conjunction with the packing cup.

FIG. 12 is a view taken along the lines 12—12 of FIG. 10 in the direction of the arrows.

FIG. 13 is a view taken along the lines 13—13 of FIG. 10 in the direction of the arrows.

FIG. 14 is a side, somewhat schematic, view of the brake actuator of FIGS. 1 and 2 showing the brake operating rod operably connected to a conventional slack adjuster (with the full line showing of the latter denoting the service piston in fully retracted position as in FIG. 1 and in dotted lines with the service piston moved outwardly in service brake application).

FIG. 15 is a side view in full lines of the brake actuator in FIG. 7, showing, schematically, attached to the end of the brake operating rod, a conventional slack adjuster, the full line showing denoting the service piston fully retracted as is the case in FIG. 7 and in dotted lines the service brake having been applied.

BACKGROUND OF THE INVENTION

The general intent of all spring brake actuators is to provide a means of applying the foundation service brakes on one or more axles of a vehicle when same has lost its normal air pressure required to operate the service brake chamber. Under these conditions, it is considered operating as an emergency brake. When the air pressure that is introduced to the spring mechanism air chamber is controlled by the driver and only exhausted after a vehicle is brought to a stop with its service brakes, then it is considered a parking brake.

"Add-on" units are basically spring brake chambers that are attached to a portion of the existing service brake chamber that is already mounted on the vehicle. The add-on type transfers the spring force through a sealed common inner wall, thence to the pressure side of the usual service brake diaphragm, then through the brake application rod and mechanism to the brake shoes, whether it is a cam or a wedge brake mechanism.

Howze U.S. Pat. No. 2,854,954 issued Oct. 7, 1958 for "Vehicle Brake Operating Mechanism" shows the fundamental add-on or "piggy-back" type spring emergency and parking brake.

Frankhouser et al. U.S. Pat. No. 3,065,997, issued Nov. 27, 1962 for "Vehicle Brake Operator" shows a brake actutator wherein the service chamber is outboard (with respect to the vehicle axle) of the spring emergency and parking chamber, the movable wall in the service chamber being a diaphragm.

DESCRIPTION OF FIGS. 1–3, INCL.

Figure 1:
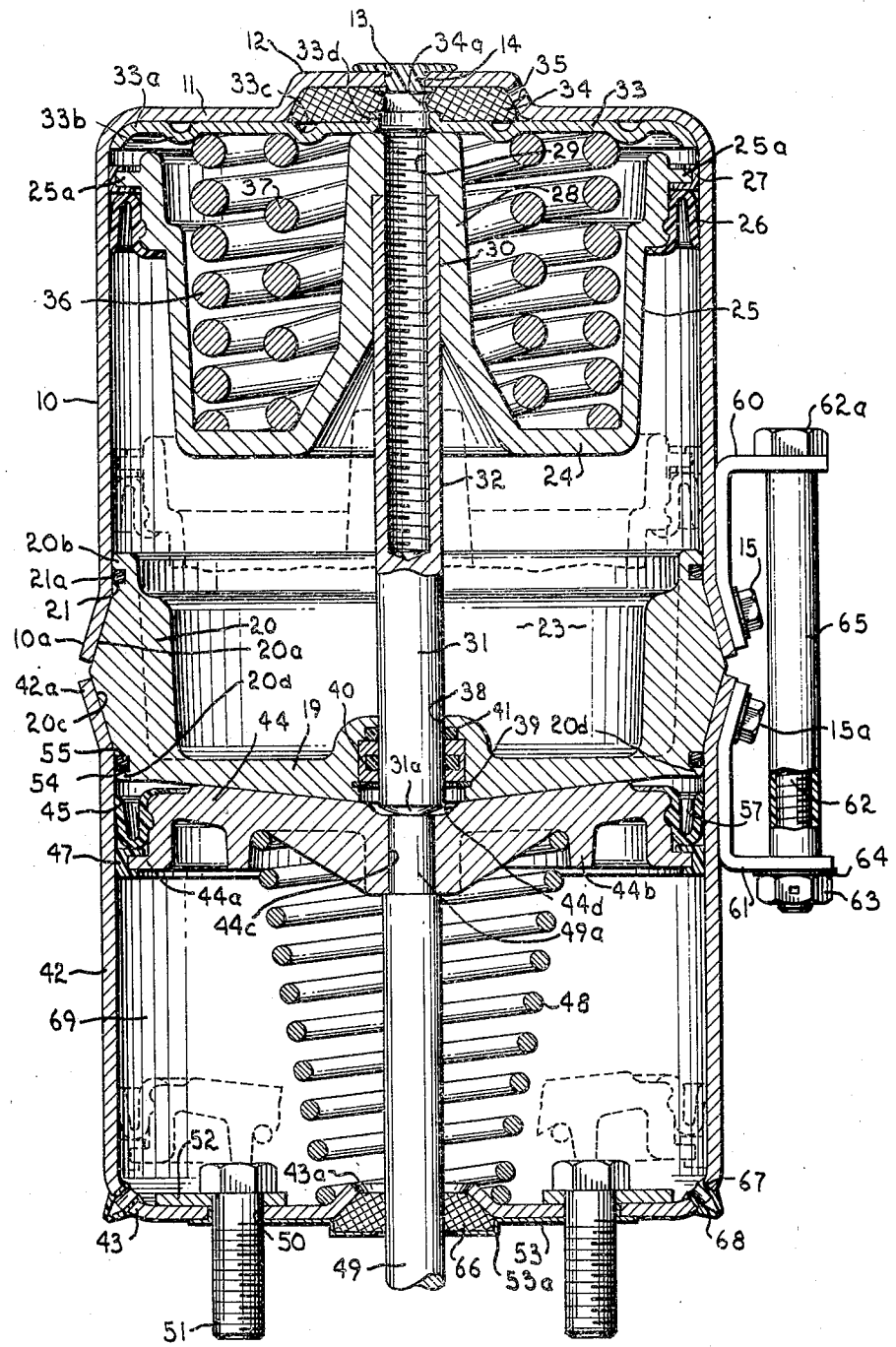
FIG. 1 is a side sectional view of an add-on brake actuator embodying the subject invention with parts cut away to better illustrate the structure and dotted line showings indicating the position of the pistons in both sections of the actuator when the power spring is in action.

Referring, then, to FIG. 1, at 10 is seen the cylindrical side wall of a spring brake housing. This housing preferably deviates slightly from cylindrical in that the outboard section (upwards in FIG. 1) has a slightly lesser internal diameter than that of the inboard section. The outboard wall 11 of cylinder 10 is away from the vehicle axle which is downwardly in the view of FIG. 1. Wall 11 may have raised center portion 12 provided with central opening 13 therein, whereby to receive a resilient removable plug 14 therewithin. The inboard end 10a of cylinder 10 is preferably circumferentially outwardly flared for connecting purposes to be described and receives therethrough bolts 15. Bolts 15 secure (removably) cylinder 10 to the peripheral outwardly extending wall portion 20 of an interwall or bulkhead 19.

Bulkhead 19 serves to divide the spring emergency chamber from the service chamber and is the inward termination of the former and the outward boundary of the latter. An outboard portion 20a of wall 20 is tapered to abut the flared portion 10a of cylinder 10 and receives bolts 15 at spaced intervals through portion 10a thereinto. The most outboard portion 20b of wall 20 has a cylindrical peripheral wall portion with a circumferential recess 21 therewithin operative to receive seal 21a adapted to seal against said wall part. Air input fitting 22 penetrates wall portion 10a and wall 20 in the bevelled zone 20a to input air under pressure into cavity 23 on the inboard side of the piston to be described. (Fitting 22 is not seen in FIG. 1 but may be seen in FIG. 2.)

Power piston 24 has a peripheral skirt 25 thereon carrying pressure seal 26 (packing cup), with piston bearing 27 carried on circumferential flange 25a of the piston. Piston 24 further has central hub 28 having a central opening 29 therewithin, as well as recess 30. Push rod 31 is fixedly received within recess 30 and has a central outboard opening 32 therewithin adapted to receive a back-off bolt to be described. Opening 32 is internally threaded to receive a mechanical release bolt in conventional fashion.

There is additionally provided a spring locater 33 having an arcuate peripheral portion 33a fitting in the curvature joining the cylinder wall 10 and outer wall 11, as well as a pair of circular ridges 33b and 33c concentrically received thereon. A central opening 33d is also provided aligned with opening 13. Filter 34 having a central opening 34a therewithin is positioned between spring locator 33 and central portion 12 of the outer wall 11 to filter air passing through opening 35 in wall portion 12.

Member 33 holds springs 36 and 37 in relative position, as well as filter 34, further aiding in reinforcement of the top of housing 11. Member 33 may have an alternate spring positioner ridge (not seen) between or in place of ridges 33b and c. Piston 24 stops on the center portion of retainer 33 as seen in FIG. 1.

Springs 36 and 37 abut with their outermost ends the inner face of the spring locater 33 (positioned by ridges 33b and 33c) and with their inner ends the outer face of piston 24. A central opening 38 is provided through bulkhead 19 whereby push rod 31 may pass in sealed reciprocating fashion therethrough. Retainer ring 39 is positioned in a recess in opening 38 and retains nylon bushing 40 and small seal or O-ring 41 outboard thereof.

Referring the lower part of FIG. 1, a substantially cylindrical housing wall 42 having flared outboard end 42a and inboard end or wall 43 defines the service chamber. Again, wall 42 is drafted toward the end wall, in this case, wall 43, whereby the piston fit in the cylinder is tighter toward end wall 43.

Piston 44 carries pressure seal 45 (packing cup) on its outboard periphery with piston bearing 47 mounted on circumferential flange 44a. Inboard ring flange 44b operates as a spring retainer for the piston return spring 48 which abuts the inboard face of piston 44 at its outboard end and wall 43 at its inboard end. Brake rod 49 is rigidly and fixedly received in central opening 44c in service piston 44.

Openings 50 are provided in end wall 43 of the service chamber through which extend bolts 51 having reinforcements 52 associated therewith. A filter retainer ring 53 is fixed centrally to the outer surface of wall 43 and has central opening 53a therewithin.

Filter 66 is carried within ring 53 and frictionally engages rod 49 which reciprocates therethru. Filter 66 is typically of open cell polyurethane whereby all air into space 69 passes therethru.

Returning to bulk head 19, the inboard periphery 20c thereof is tapered circumferentially to abut against the inner surface of the flared portion 42a of cylinder 42.

Figure 2:
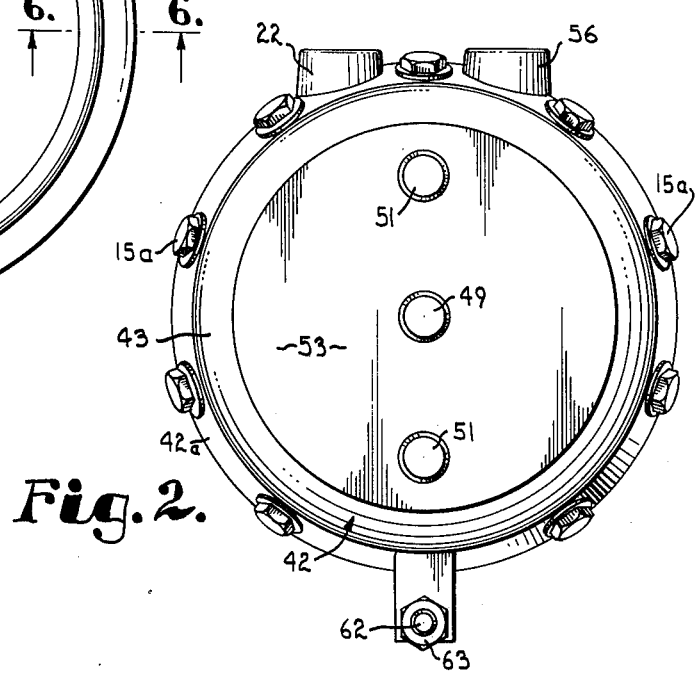
FIG. 2 is an end view of the brake of FIG. 1 looking upward from below in FIG. 1.
Figure 3:
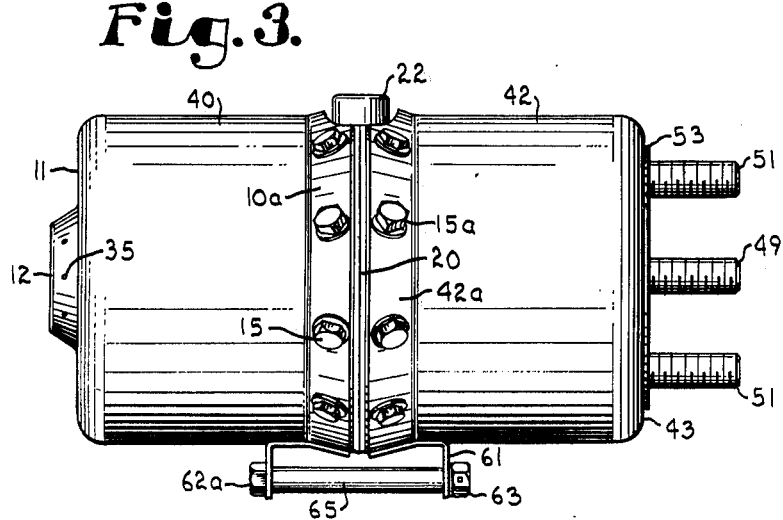
FIG. 3 is a side view in full lines of the brake actuator of FIGS. 1 and 2.

The most inboard peripheral portion of bulk head 19, 20d, receives in a circumferential recess or groove 54 thereof seal member 55 which seals against the outer most cylindrical portion of cylinder 42. Suitable bolts 15a at spaced intervals removably connect the cylinder portion 42a to wall portion 20c. Additionally, an air inlet fitting 56 passes air through an opening in the wall portion 20c and bulkhead 19 to the space 57 above the piston 44 in normal operation of the service brake, per se (FIG. 2).

A pair of brackets 60 and 61 are provided mounted on bolts 15 and 15a, one bolt on each cylinder, whereby to removably mount elongate externally threaded bolt 62 thereon. A nut 63 and washer 64 are provided to retain bolt 62 in the brackets at one end thereof, the enlarged head 62a of the bolt serving for retention at the other. A plastic sleeve 65 may be provided for weather protection to the bolt threads. Bolt 62 is used in mechanical release of the power spring piston 24 through openings 13 and 29 in conventional manner.

In FIG. 1, piston 44 tilts somewhat in cylinder 42. This tilting is necessary because the rod 49, which is rigidly attached to piston 44, does not move downwardly (as shown on the drawing) in a straight line. That is, the end of the rod 49 is attached to a pivoted slack adjuster and consequently moves in an arcuate path. Because of this, piston 44 employs a packing cup 45 and piston bearing 47 which, in combination, allow the piston 44 to tilt, and at the same time, maintain a seal against air pressure in the space 57 above piston 44 and below bulk head 19.

The top of piston 44 and the bottom of bulk head 19 are mating spherical surfaces which allow piston 44 to seat properly at its uppermost position, even if it is tilted in the cylinder.

Provision is made for filtering air and removing water in the device of FIG. 1. Thus, in FIG. 1, when piston 44 moves upwardly or piston 24 moves downwardly, atmospheric air is pulled into the actuator (spaces 69 and 70, respectively). Because the actuator attached to a vehicle is typically located close to the ground, the atmospheric air frequently contains dust. Such dust interferes with the seals between the cups 57 and 26 and their corresponding cylinder walls. It also causes excessive wear on the cups. For this reason, filters are used in FIG. 1 at 34 and 66. The construction of filters 66 allows slight sideward motion of rod 49 as it reciprocates therethrough. Typically, filters 34 and 66 are made of open cell, polyurethane flexible plastic.

Related to the dust problem is moisture, which is also brought into the actuator with atmospheric air. Water in the cylinder, like dust, causes difficulty with the cups 57 and 26 and possibly causes corrosion of the cylinder walls. Check valves 68 allow water to drain out, but do not allow air or water to enter. Because the actuator is normally mounted with the end containing check valve 68 downwardly, with the axis of the actuator at an angle to the vertical, gravity will allow water to drain through the check valves.

Water can also enter the space above piston 24. It is not practical to drain this. However, piston 24 remains in the upward position all of the time the vehicle is in motion and only moves to its downward position when the vehicle is parked. On the other hand, piston 44 frequently moves as the vehicle is in operation. Consequently, there is much more opportunity for moisture to be brought into the space below 44 which can be drained out through check valve 68.

In FIG. 1, cylinder 10 and cylinder 42 are basically the same. The only difference is in the closed ends of the cylinder, at 12 in cylinder 10 and at 43a and 67 in cylinder 42. Also, the entire upper assembly in FIG. 1 (with the exception of one part), including bulkhead 19, cylinder 10, and piston 24 is the same as the upper assembly in FIG. 8 (to be described). The only exception is that rod 31 in FIG. 1 differs from rod 165 in FIG. 8. This interchangeability is obviously an advantage because the tooling required to make these parts is very expensive.

FIG. 1 EMERGENCY BRAKE FUNCTION

Compressed air to spring chamber 23 enters through tapped hole or fitting 22 and the air passage connected therewith. When sufficient pressure of air is present in chamber 23, piston 24 is forced upwardly or outwardly as seen in FIG. 1. This compresses the power springs 36 and 37, retracting piston rod 31 outboard through opening 38. (Full line showing of FIG. 1)

When the power springs are compressed, the service brake, operating through piston 44 and brake rod 49, works in the normal manner, that is, under the influence of the air in the service chamber 57 (outboard of piston 44) acting on piston 44. Thus, when air pressure in chamber 57 is increased, piston 44 is forced downwardly or inwardly in the view of FIG. 1, moving brake rod 49 thereby to apply the brake. Under service operation conditions, the emergency and parking piston 24, under the influence of the air pressure in chamber 23, remains as shown in FIG. 1 in full lines. However, when pressure is reduced in service chamber 57, piston 44 and rod 49 move outwardly to the position shown in full lines in FIG. 1, forced by piston return spring 48. This releases the brake.

When air is released from chamber 23, the power springs 36 and 37 force piston 24 downwardly in the view of FIG. 1, thereby applying the brakes. The brakes can be released only by reinstating the air pressure in chamber 23 or by using a mechanical release means as has been shown in the art and will not be shown or described here.

With respect to the inner brake rod 49 on piston 44, the particular configuration of the periphery of the piston 44 and the seal and bearing associated therewith permit limited canting of piston 44 and allow an arcuate path of the inner push rod, while still maintaining the piston seal. This sealing system is also particularly useful where the cylindrical service housing 42 has a lesser internal diameter inboard of the service chamber and a slightly greater inner diameter outboard thereof.

The piston peripheral bearing 47 is preferably a snap over nylon ring having a contoured radius on the periphery of the bearing area. This member carries the side bearing loads of piston 44. The packing cup 45 provides the basic air seal with the outer lip sealing against the inner face of the cylinder 42. The greater the air pressure in chamber 57, the greater the seal. A reduction in the air pressure in chamber 57 reduces the force against the wall of packing cup 45 and reduces wear thereon.

In addition to providing filter 66 surrounding shaft 49 and retained by member 53a surrounding opening 43a in end wall 43, there are additionally provided a plurality of openings 67 spaced around the juncture of end wall 43 and side wall 42 of the service chamber. Several one-way check valves 68 are provided positioned within openings 67 so that air exhausted from the inboard (of piston 44) chamber portion 69 either passes through the filter 66 or checks 68. As the piston 44 moves upwardly and downwardly in the view of FIG. 1 in operation of the brakes, any air which is drawn into the chamber 69, as the piston 44 moves to its full line position of FIG. 1, is passed through the filter 66.

The brake rod 49 is bonded to piston 44. The upper portion thereof 49a is received in opening 44c. An arcuate depression 44d is provided in the upper face of piston 44 thereby to receive the rounded end 31a of push rod attached to piston 24 directly on the outboard end of push rod 49. No pad is required on the end of push rod 31 in view of the presence of piston 44 as opposed to a diaphragm. This enables the caging of piston 24 by threading of bolt 62 into internally threaded opening 32, removal of bolts 15 from the inboard end of housing 10 and the pulling of push rod 31 out through opening 38. Thus the entire add-on spring emergency and parking chamber may be removed by caging piston 24 without removing wall 19 from its connection to wall 42 of the service chamber.

In any piston service unit which is inboard as seen in FIG. 1, it is necessary to let the piston articulate or the rod oscillate with the slack adjuster. FIG. 1 shows a rigid rod connection to piston 44 with seal 45 and piston bearing 47 which permit canting or articulation of the piston within the chamber 42 to a sufficient degree that operation of the slack adjuster and arcuate movement of rod 49 is permitted to a sufficient degree.

FIGS. 4–6, INCLUSIVE

Figure 5:
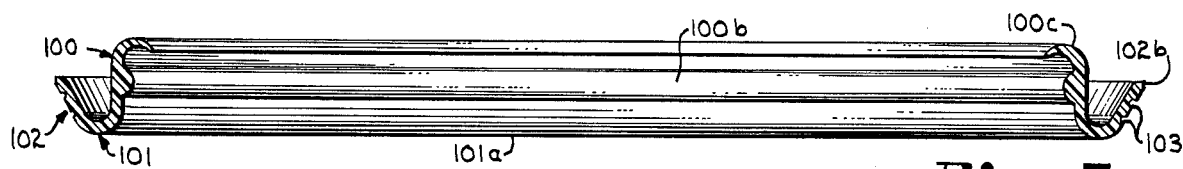
FIG. 5 is a view taken along the lines 5—5 of FIG. 4 in the direction of the arrows.
Figure 4:
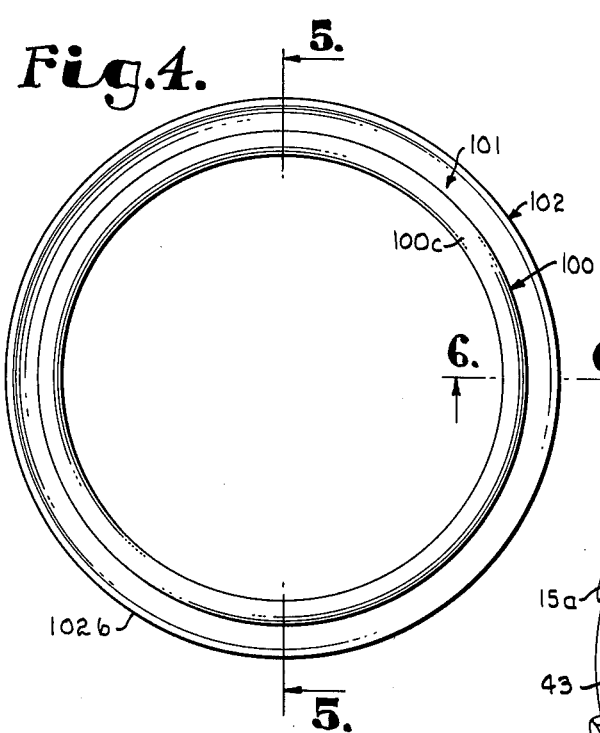
FIG. 4 is a plan view of the piston packing cup looking upwardly on the upper piston cup in FIG. 1 and downwardly on the lower piston cup in the same figure.
Figure 6:
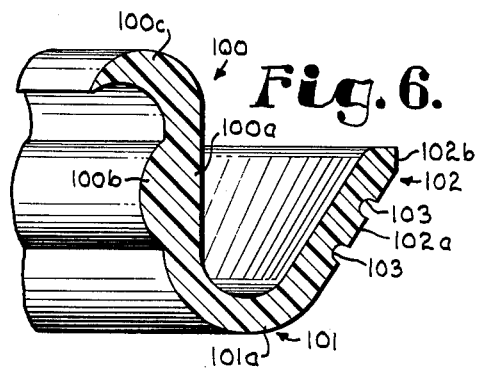
FIG. 6 is a view taken along the lines 6—6 of FIG. 4 in the direction of the arrows.

In FIGS. 4–6, inclusive, there are shown details of the packing cup which is seen in FIG. 1 at 26 in the outboard emergency power piston and at 45 on the inboard service piston. In each case, same is backed up by a piston bearing (27 or 47) away from the side of the piston which is pressurized.

FIG. 4 is a plan view of the packing cup looking into same from the pressurized side of (either) piston 24 or 44. FIG. 5 is a view taken along the lines 5—5 in the direction of the arrows, while FIG. 6 is an enlarged sectional view taken along the lines 6—6 of FIG. 4 in the direction of the arrows.

Referring, then, to FIGS. 4–6, inclusive, the packing cup has three basic portions, namely, a radially inboard portion generally designated 100, an intermediate cavity portion 101, and an outboard (radially outboard) lip portion generally designated 102. The radially inboard portion 100 has a body portion 100a receiving substantially centrally thereof an arcuate ridge 100b. There is, additionally, an overhanging radially inwardly extending portion 100c which overlies in continuous frictional contact the radially outboard portion of the piston on which the packing cup is fitted. The cavity portion 101 is an arcuate base portion interconnecting the inboard and outboard portions of the cup. The arcuate convex portion thereof 101a typically lies on and engages the piston bearings 27 and 47. It should be noted that the peripheral face of each piston 24 and 44 is configured so as to receive within a groove thereon the ridge 100b.

Referring to the radially outboard flange portion 102, the radially outboard face 102a thereof contains one to three lubricant grooves 103 therewithin. Additionally, the radially outward and end portion 102b thereof is flattened for frictional engagement with the inside wall of the cylinder within which the piston mounting this packing cup moves.

A typical material for the packing cup is natural rubber with a urethane coat finish. Typical durometer hardness would be 85 plus or minus 5.

In operation of the packing cup with respect to either piston 24 or piston 44 of FIG. 1, application of pressure to the side of the piston on which the packing cup opens has two effects. In the first place, the pressurization tends to seat the inboard portion of the packing cup more firmly against the outer and peripheral face of the piston. Simultaneously, pressure seats the arcuate face 101a away from the pressurization against the piston bearing 47 or 27. Further, the pressurization tends to force the outboard (radially) cup flange 102 against the cylinder (42 or 10, respectively) inside surface wall. Since, in each of the cases of cylinders 42 and 10, the inner diameter of the cylinder decreases as the piston acts and moves under pressurization, this, further, together with the packing cup seal, tends to seal pressurization either on the downward side of piston 24 (FIG. 1) or the upper side (same figure) of piston 44. Thus it is seen that, not only is piston strength and integrity achieved in both the service and emergency chambers (57 and 23), the pistons are rigorously sealed in their reciprocatory motions, retaining the pressurization thereof in action. This is true even if the service piston 44 should tilt as the rod 49 follows the slack adjuster in brake activation and release.

FIG. 7

Figure 7:
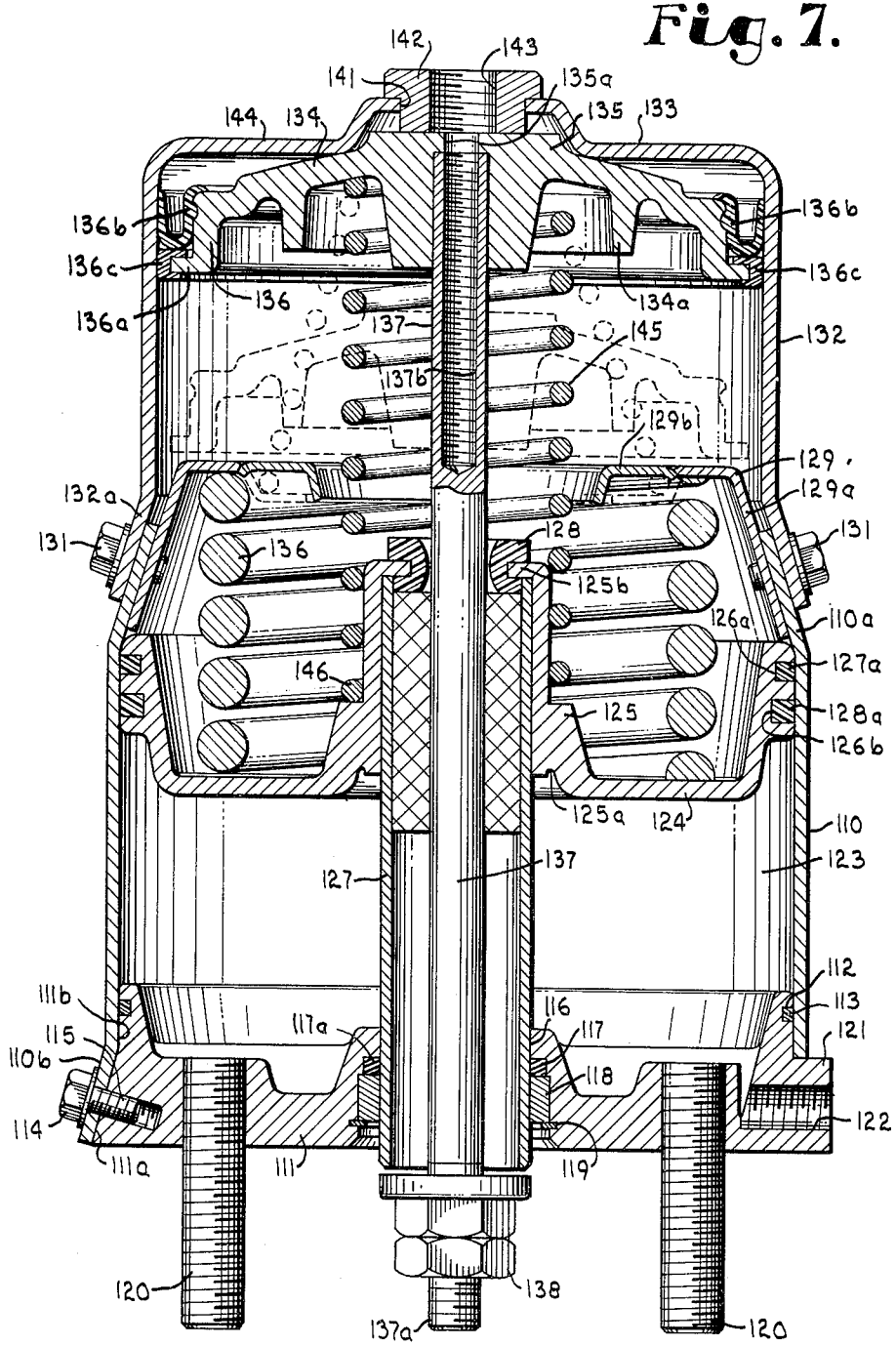
FIG. 7 is a side sectional view of a double piston brake actuator having an outboard service chamber and inboard spring emergency and parking chamber, there being parts cut away to better illustrate the structure and dotted line showings indicating the position of the service chamber piston when the brake is applied. There is also a dotted line showing of an alternative location for the service piston return spring.
Figure 11:
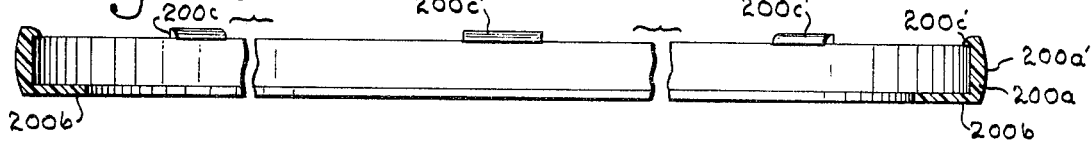
FIG. 11 is a cross sectional view of the device of FIG. 10.

Referring to FIG. 7, therein is shown the double piston brake actuator wherein the service function or chamber is positioned outboard (with respect to the axle) of the emergency function or emergency chamber.

At 110 is seen the emergency chamber housing having an outboard inwardly tapered portion of lesser internal diameter 110a and an inboard portion of outwardly tapering configuration to a greater outer diameter 110b. The semi-cylindrical portion 110 actually tapers slightly outwardly toward a lesser diameter. The inboard wall of the emergency chamber is a removable circular member 111 having an inboard tapered portion 111a and an outboard semi-cylindrical portion 111b to frictionally fit within the inboard portions 110b and 110 of the emergency cylinder. In wall portion 111b there is provided a groove 112 carrying a pressure seal or O-ring 113. Suitable bolts 114 removably fix wall 111 to cylinder 110, threading into internally threaded recesses 115 in wall portion 111a. Centrally of wall 111 there is provided a circular opening 116 having an outboard recess 117 therein carrying bushing 118 and seal 117a removably fixed therewithin by retainer ring 119. Suitable bolts 120 serve for fixing the innermost wall 111 and the entire brake actuator assembly to the vehicle. Cylinder 110 is relieved in the portion 110b thereof for fitting 121 having passage 122 therethrough, whereby to pass fluid under pressure into the emergency chamber 123.

Piston 124 having central boss 125 and peripheral flange 126 reciprocates within chamber 123 between inwardly tapered cylinder portion 110a and the outboard portion of wall member 111b. Boss 125 has central opening 125a therewithin which receives fixed therewithin an elongate hollow tube or sleeve 127, the latter reciprocating as the piston moves inwardly and outwardly through opening 116 guided by nylon bushing 118 and sealed by seal 117a. Outboard of opening 125a boss 125 has radially inwardly extending portion 125b to retain sleeve 127 and receive circumferential bushing 128 thereon. In member 126, two grooves (circumferential) 126a and 126b receive lubricator 127a and seal 128a therewithin, respectively.

Removably fixed to the inside face of inwardly tapered cylinder wall portion 110a is an annular spring retainer 129 having inboard portion 129a and outboard portion thereof 129b. One or more conventional power springs 130 are received between the spring retainer portion 129b and piston 124. Only one-half or a fraction of the bolts 131 connect spring retainer portion 129a and cylinder wall portion 132a, as will be described.

Turning to the service chamber, semi-cylinder 132 has outer wall 133 at the outboard end thereof and the inboard portion 132a thereof outwardly tapered to an inboard greater diameter, thereby to overlie (in portions thereof) the inboard cylinder wall portion 110a for connection thereto by a fraction or portion of the bolts 131. That is, the inboard portion 132a of cylinder 132 is scalloped and relieved at every other bolt location whereby every other bolt 131 connects (a) spring retainer portion 129a, (b) wall portion 110a and (c) wall portion 132a, while, alternatively, the adjacent bolts thereto connect only spring retainer 129a and wall portion 110a. In this manner, by releasing alternate bolts, the cylinder 132 may be removed from the dual piston brake assembly being described.

Piston 134 has central boss 135 and circumferential peripheral portion 136 carrying flange 136a. The former (135) has a central opening 135a therein enlarged inwardly thereby to receive brake rod 137 fixedly received or connected thereto. Portion 136 carries packing cup 136b, while flange 136a carries bearing seal 136c. Seal 136c underlies cup 136b which is forced thereagainst by pressurization of zone 144.

Brake rod 137 extends through bushing 128 and beyond the length of sleeve 127. The inboard end of rod 137 is externally threaded as at 137a whereby to carry nuts 138 and 139 threaded thereon, the latter having fixed inboard thereof washer 140 of greater outer diameter than the outer diameter of sleeve 127. At the outboard end of rod 137, same is internally threaded as at 137b.

Centrally of outer wall 133 of cylinder 132 there is provided opening 141 within which is fixed fitting 142 having central opening 143 therethrough. Opening 143 is internally threaded to receive a bushing to pass fluid under pressure into chamber 144 between the outboard face of piston 134 and the inner face of outer wall 133. Further, the shaft of an enlarged headed bolt (not seen) may be passed down through opening 143 and the opening of the bushing (not seen) received therewithin in order to threadably engage internally threaded passage 137b for the process of mechanical release of the brake.

A service piston return spring 145 is provided between bracing ribs 134a on the inboard face of piston 134 and either a shelf 146 on the emergency piston boss 125 or a recessed platform (dotted lines) on the outboard face of spring retainer portion 129b.

In FIG. 7, piston 134 tilts in cylinder 132. This tilting is necessary because the rod 137, which is rigidly attached to piston 134, does not move downwardly (as shown in the drawing) in a straight line. The end of the rod 137a is attached to a pivoted slack adjuster and consequently moves in an arcuate path. Piston 134 thus employs a packing cup and piston bearing as shown at 26 and 27 in FIG. 1. This allows the piston to tilt, and at the same time, maintains a seal against air pressure.

It was also pointed out that in FIG. 1 the top of piston 44 and the bottom of bulkhead 19 are mating spherical surfaces which allow the piston to seat properly at its uppermost position, even though it is tilted in the cylinder. Likewise, in FIG. 7, the top of piston 134 and a portion of the bottom of the cylinder end 133 are mating spherical surfaces.

FIG. 7 OPERATION

In operation of the double piston brake actuator of FIG. 7, air pressure input through opening 143 and wall 133 causes piston 134 and brake rod 137 to move downwardly in the view of FIG. 7, or inboard, whereby to apply the brake, typically, through camming or wedging action in conventional manner. During such conventional service chamber or service brake operation utilizing piston 134, return of the piston is caused by piston return spring 145, normally to the full line position of FIG. 7 on release of air pressure into chamber 144.

During normal service operation, air pressure is maintained in chamber 123 through passage 122 in fitting 121 whereby power spring 130 is compressed as seen in full lines in FIG. 7. When, for whatever reason, air pressure is released from chamber 123, then power spring 130 causes piston 124 to move downwardly in the view of FIG. 7 to apply the brake via sleeve 127 acting on washer 140 and nuts 138 and 139, thereby to drive brake rod 137 downwardly in the view of FIG. 7. Restoration of air pressure in chamber 123 again moves the piston 124 upwardly in the view of FIG. 7 to the full line position there seen, whereby to permit normal service brake operation. The inboard end of retainer 129 acts as a piston stop for piston 124, while outer wall 133 acts as an outboard stop for piston 134 and spring retainer portion 129b as the inboard stop for piston 134.

Mechanical release through bolt engagement of the ppiston 134 and rod 137 via opening 143 pulls back piston 124 against spring 130 via sleeve 127 and fixed washer 140.

FIGS. 8 & 9

Referring to FIGS. 8 and 9, therein is shown an improved single chamber brake actuator. Semi-cylinder 150 has inboard outwardly tapered portion 150a and outer wall 151. Inboard pressure wall 152 has central boss 153 and peripheral ring flange 154. The latter has outwardly beveled face 154a tapering outwardly (from the vehicle axle) to a lesser diameter and semi-cylindrical portion 154b. The inboard periphery of ring 154 is beveled in the opposite direction as at 154c with a cylindrical portion 154d inboard thereof. Semi-cylindrical portion 154b and cylindrical portion 154d each have grooves 155 and 156 therein, respectively, to receive sealing O-rings therewithin. Centrally of boss 153 there is provided an opening 153a, same enlarged inboard as at 153b and c. Nylon bushing 157 is received between O-ring 158 and retainer ring 159. Fitting 160 has a passage therethrough which also passes through ring 154 to supply fluid under pressure to the actuator pressure chamber 161.

Piston 162 has central boss 163 and peripheral flange 164. The former has a central opening 163a, same enlarged inwardly to receive fixedly or seized therewithin the brake rod 165. Brake rod 165 is hollow centrally as at 165a, also receiving internally threaded insert 165b therewithin. Outer piston portion 164 has flange 164a adapted to receive piston bearing 166 mounted thereover, as well as circumferential groove 164b which cooperates in mounting packing cup 167 on the piston portion 164. Packing cup 167 is of the configuration seen in FIGS. 4–6, inclusive.

Spring retainer 168 has central flange 169 thereof defining a central opening therethrough and peripheral inboard directed flange 170 configured to snugly fit within the curved wall portion connecting side wall 150 and end wall 151. Spring positioner boss 168a serves to divide and position paired power springs 171 and 172. The outboard portion of center boss 163 abuts on the center portion of retainer 168 as a stop.

Ring filter 173 of porous material filters air flowing in and out of openings 174 in the central raised portion 151a of outer wall 151 when seal cap 175 is in place in opening 151b centrally of end wall 151.

Removal of cap 175 (of resilient plastic material or rubber) permits the insertion of a mechanical release bolt for threaded engagement with internally threaded insert to maintain power springs 171 and 172 in compression. Such bolt is not seen in the view but may be like that bolt seen in FIG. 1. Bolts 176 fix cylinder 150 to ring 154.

A secondary inboard housing is provided by cylindrical wall 177 having inboard wall 178 and outboard outwardly tapered wall portion 179. The latter is removably fixed by bolts 180 to ring 154. Central opening 178a is provided in end wall 178, as well as openings 178b to pass bolts 181 therethrough for mounting of the brake actuator on a vehicle or the like. Reinforcing ring 182 having holes 182a therethrough may be positioned inboard of inboard wall 178.

The inboard end of brake rod 165 has a passage 164b therewithin, same internally threaded. Stub shaft 183 is threadably engaged therewithin, locked by set screw 184 against rotation. Shaft 183 has flange 185 thereon. A Y-shaped yoke 187 having bifurcated arms 187a outboard thereof is pivotably fixed to flange 185 by pin 186. The inboard portion of yoke 187 is an externally threaded rod 187b which carries washer 188 and lock nut 189 thereon. Yoke 187 is square or rectangular section while portion 188 is circular section.

In operation of the single chamber brake actuator of FIG. 8, fluid under pressure input through fitting 160 forces piston 162 upwardly in the view of FIG. 8 to the full line showing of that drawing. This compresses power springs 171 and 172. Whenn the air pressure is released from chamber 161, by whatever means, piston 162 moves downwardly in the view of FIG. 8, applying the brake, to which rod 187b is connected via conventional cam or wedge (or other) means. The pivotal connection between rod 165 connected to piston 162 and rod 187b, through pin 186, permits the employment of a slack adjuster with the brake without objectionable tilting of rod 165 and the piston 162. Even if there were tilting of piston 162, the packing cup 167 and piston bearing 166 would serve to retain pressurization therewith. However, the nylong bushing 157 and the pivotal mounting just mentioned serve to maintain axial movement of rod 165 to and fro through opening 153a. For mechanical release of piston 162 (caging of power springs 171 and 172), cap 175 is removed and a bolt (as is seen in FIG. 1) with or without a washer lying on the raised portion 151a around opening 151b may be used to capture and back off piston 162.

When the power springs 171 and 172 are caged by mechanical release as described, pin 186 may be removed and the brake rods 165 and 187 are disconnected. Thereafter, by removal of bolts 180, access may be had to bushing 157 and seal 158. Groove 156 needs no seal as there is no pressure. Also when the power springs are caged and set screw 184 removed, whereby stub shaft 183 may be removed from opening 164b, then bolts 176 may be removed and the entire outboard cylinder 150 removed for access to packing cup 167 and piston bearing.

FIGS. 10–13, INCLUSIVE

FIGS. 1 and 7 (outboard service chamber piston) show the configuration of the piston bearing (27, 47 in FIG. 1) wherein same is C-shaped in transverse section, but with the leg of the C away from the pressurization side of the piston shorter than the C-leg on the pressurization side of the piston. That is, the C-section leg of piston bearing 27 in FIG. 1 on which the packing cup 26 rides, is longer than the C-section leg on the other side of the flange 25a of piston 24. Thus, consistently, looking in the lower portion of FIG. 1 at piston 44, the piston bearing 47 removably mounted on continuous flange 44a has the longer C-section leg upwardly in the view because the pressurization with respect to piston 44 is in the space 57.

FIGS. 10–13, inclusive show an alternative form piston bearing generally designated 200 with a radially outboard of peripheral wall 200a, an elongate flange 200b and a plurality of spaced, opposed engagement tabs 200c spaced along the opposite edge of wall 200a from flange 200b. It should be noted that the peripheral surface 200a' is radiused to allow for piston tilt. The face 200c' is also rediused as particularly seen in FIG. 12. The discreet, non-continuous tabs 200c make the application and removal of the piston bearing 200 easier and more convenient than seals 27 and 47 of FIG. 1, for example, which have continuous flanges as both legs of the C-section shown. The pressurization on the packing cups (such as 26 and 45 in FIG. 1) aids in retention of piston bearings 27 and 47, for example, on the piston flanges 25a and 44a.

FIGS. 14 and 15

FIGS. 14 and 15 show, schematically, the brake actuators of FIGS. 1 and 7, respectively, in their attachment to a conventional slack adjuster, which attachment requires an arcuate path of the push rod or brake operating rod from the service chamber piston because of the rigid attachment of the brake rod to the service piston in each case.

In FIG. 14, slack adjuster 250 is rigidly, but pivotally attached to the end of brake rod 49 by pin 251. As the brake rod 49 moves downwardly in the view to apply the brakes, driven by service piston 44 (FIG. 1) which is rigidly attached thereto, slack adjuster 250 pivots around its own shaft mounting 252 causing rod 49 to move in an arcuate direction, as seen in the view, and thus, in turn, causing piston 44 to articulate around the piston bearing 47 on flange 44a (FIG. 1). Once the service brake application is completed, return spring 48 (FIG. 1) moves piston 44 upwardly to the full line position of FIG. 1 with the rod 49 and slack adjuster 250 of FIG. 14 in the full line position therein. Again, on the return stroke, the piston 44 articulates around bearing 47.

In FIG. 15, which is a full line reduced view of the outside of the brake actuator of FIG. 7, the brake rod 137, at its threaded end 137a, is pivotally connected, via pin 253, to conventional slack adjuster 254, the latter itself pivotally mounted on shaft 255. The full line showing of FIG. 15 corresponds with the full line showing of FIG. 7 with the service piston fully retracted under the action of return spring 145. The dotted line showing of FIG. 15 corresponds to a service brake application of the device of FIG. 7. In service brake application, brake operating rod 137 moves downwardly (to the dotted line position of FIG. 15) in an arcuate path, whereby service piston 134 articulates in cylinder 132 (FIG. 7) around the bearing seal 136c on piston flange 136a. On return of piston 134 by return spring 145 to the full line position of FIG. 15 (and FIG. 7), a like articulation takes place due to the arcuate return path of brake rod 137.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. Brake actuating mechanism comprising, in combination, a closed housing having inner and outer end walls, said walls inner and outer with respect to a vehicle brake mechanism, a first piston within said housing adapted to reciprocate inwardly and outwardly therewithin, means for introducing fluid under pressure to said housing adjacent the outer end wall thereof and to the outer side of said first piston, a brake operating rod on the other, inner side of said first piston axially arranged relative thereto and rigidly connected centrally thereof at one end of said rod, said rod projecting through the inner end wall of the housing for reciprocatory movements, means attaching the other end of said brake operating rod to a pivoted slack adjuster whereby said rod moves in an arcuate path, thus requiring the said first piston to cant or articulate within the housing during reciprocation therewithin, an auxiliary compartment at the outer end of said housing, the outer end wall of said housing constituting the inner end wall of said compartment, the inner end wall of the compartment having a central opening therethrough, the outer end of said compartment closed by an outer wall member, a second piston within said compartment with the outer face thereof facing the outer wall of said compartment, coil compression spring means seating between said second piston outer face and compartment outer wall member, a rod fixedly connected centrally to said second piston, extending inwardly thereof and having a sliding fit through the housing outer end wall central opening, means air sealing the second piston rod through the said housing outer end wall, means for introducing fluid under pressure to said compartment adjacent to the housing outer wall and inboard of the second piston for normally holding the second piston in the region of the compartment outer wall, thereby to hold said coil compression spring means under compression, said fluid under pressure introduced into a second piston pressurization chamber between the second piston inner face and the housing wall outer face, said first piston configured peripherally so as to be able to articulate or tilt within the housing during reciprocation therewithin by said first piston having a considerably lesser outer diameter than the inner diameter of said housing and a radially extending circumferential flange positioned peripherally therearound, said flange spaced inwardly on the first piston from the outer end thereof, and means on the periphery of said piston and cooperating with the housing to maintain continuous circumferential bearing contact and seal therewith during reciprocation, said means comprising, in combination, a hollow-centered circumferential packing cup mounted on the periphery of the first piston outboard of the flange on the piston and opening toward the outer pressurized side of said piston, and a separate circumferential piston bearing removably fixed on the periphery of said circumferential flange on said piston, said packing cup resting on and backed by said piston bearing.

2. Brake actuating mechanism as in claim 1 wherein the outer end wall of the closed housing is removably connected to the outer end of the closed housing and the inner end of the auxiliary compartment, while the inner end wall of said closed housing is integral with the outer end of the closed housing and the outer wall member of said compartment is integral with the inner end of the auxiliary compartment.

3. Brake actuating mechanism as in claim 1 wherein said housing has a lesser inner diameter inboard thereof, whereby said first piston seals more tightly against the inner surface thereof as said first piston moves inwardly, said compartment being of lesser inner diameter outborad thereof whereby said second piston seals more tightly therewithin as same moves outwardly therewithin.

4. Brake actuating mechanism as in claim 1 wherein the wall comprising the outer end wall of said housing and the inner end wall of said compartment has a first inboard peripheral face adapted to receive in continuous, circumferential abutment the outwardly flared outboard end of said housing and an outboard peripheral portion formed to continuously abut the outwardly flared inboard end of said compartment.

5. Mechanism as in claim 1 including a hollow ring spring retainer positioned inboard of the outer end wall of the auxiliary compartment.

6. Brake operating equipment of the kind comprising
a brake actuating member reciprocable in brake applying and brake releasing directions,
the brake operating equipment being divided into two sections respectively operating as service and emergency braking devices,
the service braking device including a fluid pressure chamber having a supply connection provided for introduction of pressure fluid and having a reciprocable, fluid pressure responsive, first piston-type wall element for imparting brake applying motion to the brake actuating member rigidly connected to one end thereof,
means attaching the other end of the brake actuating member to a pivoted slack adjuster, whereby said rod moves in an arcuate path, thus requiring the said first piston-type wall element to cant or articulate within its chamber during reciprocation therewithin,
the emergency braking device including a fluid pressure chamber having a reciprocable, fluid pressure responsive, second piston-type wall element,
said second wall element being movable in one direction to effect emergency application of the brake,
a supply connection normally providing for introduction of pressure fluid into that one of the fluid pressure chambers in which the pressure acting on said second wall element tends to move it in the opposite direction from that effecting emergency brake application, and
a spring acting on said second piston-type wall element urging it to move in said direction effecting emergency application of the brake,
said first piston-type wall element configured peripherally so as to be able to articulate or tilt within the service fluid pressure chamber during reciprocation therewithin by having a considerably lessser outer diameter than the inner diameter of said housing and a radially extending circumferential flange positioned peripherally therearound, said flange spaced inwardly on the first piston-type wall element from the outer end thereof,
means on the periphery of said first wall element cooperating with the said chamber to maintain continuous circumferential bearing contact and seal therewith during said reciprocation, said means comprising a hollow-centered circumferential packing cup mounted on the periphery of the first piston-type wall element outboard of the flange on said piston-type wall element and opening toward the outer, pressurized side of said piston-type wall element, and a separate circumferential piston bearing removably fixed on the circumferential flange on the periphery of the piston-type wall element, said packing cup resting on and backed by said piston bearing.

7. Brake actuating mechanism comprising, in combination,
a closed housing having inner and outer end walls,
said walls inner and outer with respect to a vehicle brake mechanism,
a first piston within said housing adapted to reciprocate inwardly and outwardly therewithin,
means for introducing fluid under pressure to said housing adjacent the outer end wall thereof and on the outer side of said first piston,
a brake operating rod on the other, inner side of said first piston axially arranged relative thereto and rigidly connected centrally thereof at one end of said rod,
said rod projecting through the inner end wall of the housing for reciprocatory movements,
means attaching the other end of said brake operating rod to a pivoted slack adjuster whereby said rod moves to an arcuate path, thus requiring the said first piston to cant or articulate within the housing during reciprocation therewithin,
an auxiliary compartment at the outer end of said housing,
the outer end wall of said housing constituting the inner end wall of said compartment,
the inner end wall of the compartment having a central opening therethrough,
the outer end of said compartment closed by an outer wall member,
a second piston within said compartment with the outer face thereof facing the outer wall of said compartment,
coil compression spring means seating between said second piston outer face and compartment outer wall member,
a rod fixedly connected centrally to said second piston, extending inwardly thereof and having a sliding fit through the housing outer end wall central opening,
means air sealing the second piston rod through the said housing outer end wall,
means for introducing fluid under pressure to said compartment adjacent to the housing outer wall and inboard of the second piston for normally holding the second piston in the region of the compartment outer wall thereby to hold said coil compression spring means under compression,
said fluid under pressure introduced into a second piston pressurization chamber between the second piston inner face and the housing outer wall outer face, and
said first piston having a considerably lesser outer diameter than the inner diameter of said housing and a circumferential flange extending peripherally therearound spaced inwardly on the first piston from the outer end thereof,
the first piston having mounted on its periphery a hollow-center circumferential packing cup opening toward the outer, pressurized side of said piston,
said packing cup, on its inward portion, resting on and backed up by a separate circumferential piston bearing mounted on the circumferential flange on the periphery of the piston.

8. Brake operating equipment of the kind comprising a brake actuating member reciprocable in brake applying and brake releasing directions, the brake operating equipment being divided into two sections respectively operating as service and emergency braking devices, the service braking device including a fluid pressure chamber having a supply connection provided for introduction of pressure fluid and having a reciprocable, fluid pressure responsive, first piston-type wall element for imparting brake applying motion to the brake actuating member rigidly connected to one end thereof, means attaching the other end of the brake actuating member to a pivoted slack adjuster, whereby said rod moves in an arcuate path, thus requiring the said first piston-type wall element to cant or articulate within its chamber during reciprocation therewithin, the emergency braking device including a fluid pressure chamber having a reciprocable, fluid pressure responsive, second piston-type wall element, said second wall element being movable in one direction to effect emergency application of the brake, a supply connection normally providing for introduction of pressure fluid into that one of the fluid pressure chambers in which pressure acting on said second wall element tends to move it in the opposite direction from that effecting emergency brake application, and a spring acting on said second piston-type wall element urging it to move in said direction effecting emergency application of the brakes, said first piston-type wall element having a considerably lesser outer diameter than the inner diameter of the service fluid pressure chamber and a circumferential flange extending peripherally therearound spaced inwardly on the wall element from the outer end thereof, the first piston-type wall element having mounted on its periphery a hollow-centered circumferential packing cup opening to the outer pressurized side of said wall element, said packing cup on its inward portion, resting on and backed up by a separate circumferential piston bearing mounted on the circumferential flange on the periphery of said wall element.

9. Brake actuating mechanism comprising a closed housing having inner and outer end walls, said housing having an inner portion and an outer portion, a first piston having an inner end and an outer end slidably mounted within the outer portion of said housing adapted to reciprocate inwardly and outwardly therewithin.

means for introducing fluid under pressure to said housing adjacent the outer end wall and adjacent the outer end of said first piston, a brake operating rod on the inner end of said first piston axially arranged relative thereto and rigidly connected centrally thereof at one end of said rod, said rod projecting through the inner end wall of said housing for reciprocatory movements, means attaching the other end of said brake operating rod to a pivoted slack adjuster, whereby said rod moves in an arcuate path, thus requiring the said first piston to cant or articulate within the housing during reciprocation therewithin, coiled spring means bearing at one end against said inner end of said first piston for urging said rod and said piston in a direction toward the outer end wall of said housing, stop means in said housing positioned intermediate the inner and outer end walls thereof, a second piston slidably mounted within the inner end of the housing and having an inner side and an outer side, a compression spring bearing at its outer end against said stop means and at its inner end against said second piston outer side for urging the latter toward the inner end wall of the housing, said second piston including a sleeve extension fixedly attached thereto and defining together with said piston a bore through which said rod extends, abutment means on said rod against which said piston sleeve extension abuts, means air sealing said sleeve extension through the housing inner end wall for reciprocation therethrough, and means for introducing fluid under pressure to the inner end portion of the housing adjacent the inner side of said second piston, for normally holding said piston in position toward said stop means, whereby, upon failure of fluid pressure, said compression spring means abruptly actuates said second piston, thereby moving said operating rod for brake application, said first piston configured peripherally so as to be able to articulate or tilt within the housing during reciprocation therewithin by having a considerably lesser outer diameter than the inner diameter of said housing and a radially extending circumferential flange positioned peripherally therearound, said flange spaced inwardly on the first piston from the outer end thereof, and means on the periphery of said first piston and cooperating with the housing to maintain continuous circumferential bearing contact and seal therewith during said reciprocation, said means comprising a hollow-centered circumferential packing cup mounted on the periphery of the first piston outboard of the flange on the piston and opening toward the outer, pressurized side of said piston, and a circumferential separate piston bearing removably fixed on the periphery of the circumferential flange on the piston, said packing cup resting on and backed by said piston bearing.

10. Mechanism as in claim 9 wherein the means for introducing fluid on the outer side of said first piston is substantially centrally located in the outer end wall.

11. Mechanism as in claim 9 including an internally threaded bore centrally of said first piston adapted to receive therewithin a bolt for mechanical release of said brake actuating mechanism.

12. Mechanism as in claim 9 wherein said stop means is an annular ring and serves also to limit the inward travel of the first piston.

13. Mechanism as in claim 9 wherein the inner portion of the housing is of greater internal diameter than the outer portion thereof.

14. Mechanism as in claim 9 wherein at least a portion of the outer wall of said housing is arcuate and concave and at least a portion of the outer face of the first piston is arcuate and convex.

15. Mechanism as in claim 9 wherein the closed housing is of two part construction:

the outer part comprising a substantially cylindrical housing having a closed outer end, the inner part comprising a substantially cylindrical housing open at its outer end and having a closed inner end.

16. Mechanism as in claim 15 wherein the inner part of said housing has a removable inner wall member.

17. Mechanism as in claim 15 wherein the open inner end of the outer housing part is outwardly flared to a greater diameter, the open outer end of the inner housing part is inwardly tapered to a lesser diameter and the inner portion thereof is outwardly tapered to a greater diameter.

18. Mechanism as in claim 17 wherein the inner housing part has a removable inner wall, the peripheral surface thereof tapering from a greater inner diameter to a lesser outer diameter.

19. Mechanism as in claim 15 wherein the stop means is removably secured to the inner part of the housing.

20. Mechanism as in claim 15 wherein the stop means is removably secured to both the inner and outer parts of the housing.

21. Mechanism as in claim 20 wherein the stop means is removably secured to the inner part of the housing at a greater plurality of positions and to the outer part of the housing at a lesser plurality of the same positions.

22. Mechanism as in claim 15 wherein the means for introducing fluid on the outer side of said first piston is substantially centrally located in the outer end wall.

23. Mechanism as in claim 15 wherein the inner housing part is of greater internal diameter than the outer housing part.

24. A brake operating device having operable connection with a braking mechanism of a vehicle comprising:

a closed housing having an inner and an outer portion, a first piston slidably mounted in the outer portion, a brake operating rod fixedly connected at its outer end to the first piston, extending axially through the inner and outer portions, means attaching the inner end of said brake operating rod to a pivoted slack adjuster, whereby said rod moves in an arcuate path, thus requiring the said first piston to cant or articulate within the housing during reciprocation therewithin, a second piston slidably mounted within the housing inner portion equipped with a tubular, axial extension surrounding and having abutting engagement at its inner end with said rod, an annular member disposed in said housing intermediate the inner and outer portions, a power compression spring unit between said annular member and second piston, a rod return compression spring between the first piston and one of said second piston and annular member, and separate air inlets for introducing compressed air to the housing inner portion between the second piston and the inner end of said housing and to the housing outer portion between the first piston and the outer end of the housing, said first piston configured peripherally so as to be able to articulate or tilt within the housing during reciprocation therewithin by having a considerably lesser outer diameter than the inner diameter of said housing and a radially extending circumferential flange positioned peripherally therearound, said flange spaced inwardly on the first piston from the outer ends thereof, means on the periphery of said piston and cooperating with the housing to maintain continuous circumferential bearing contact and seal therewith during said reciprocation, said means comprising a hollow-centered circumferential packing cup mounted on the periphery of said first piston outboard of the flange on the piston and opening toward the outer, pressurized side of said piston, and a separate circumferential piston bearing, removably fixed on the circumferential flange on the periphery of the first piston, said packing cup resting on and backed by said piston bearing.

25. A brake operating device having operable connection with a braking mechanism of a vehicle comprising a closed housing having an inner and an outer portion, a first piston slidably mounted in the outer portion, a brake operating rod rigidly connected at its outer end to the first piston extending axially through the inner and outer portions, means attaching the inner end of said brake operating rod to a pivoted slack adjuster, whereby said rod moves in an arcuate path, thus requiring the said first piston to cant or articulate within the housing during reciprocation therewithin, a second piston slidably mounted within the housing inner portion equipped with a tubular, axial extension surrounding and having abutting engagement at its inner end with said rod, an annular member disposed in said housing intermediate the inner and outer portions, a power compression spring unit between said annular member and second piston, a rod return compression spring between the first piston and one of said second piston and annular member, and, separate air inlets for introducing compressed air to the housing inner portion between the second piston and the inner end of the housing and to the housing outer portion between the first piston and the outer end of the housing, said first piston having a considerably lesser outer diameter than the inner diameter of said housing and a circumferential flange extending peripherally therearound spaced inwardly on the first piston from the outer end thereof, the first piston having mounted on its periphery a hollow-centered circumferential packing cup opening toward the outer, pressurized side of said piston, said packing cup, on its inward portion, resting on and backed up by a separate circumferential piston bearing mounted on the circumferential flange on the periphery of the piston.

26. Brake actuating mechanism comprising a closed housing having inner and outer end walls, said housing having an inner and an outer portion, a first piston slidably mounted within the outer portion of said housing adapted to reciprocate inwardly and outwardly therewithin, means for introducing fluid under pressure to said housing adjacent the outer end wall and on the outer side of said first piston, a brake operating rod on the other side of said first piston axially arranged relative thereto and rigidly connected centrally thereof at one end of said rod, said rod projecting through the inner end wall of said housing for reciprocatory movement, means attaching the other end of said brake operating rod to a pivoted slack adjuster, whereby said rod moves in an arcuate path, thus requiring the said first piston to cant or articulate within the housing during reciprocation therewithin, coil spring means bearing at one end against said first piston for urging said rod and said piston in a direction toward the outer end wall of said housing, stop means in said housing positioned intermediate the inner and outer end walls thereof, a second piston slidably mounted within the inner end of the housing, a compression spring bearing at its outer end against said stop means and at its inner end against said second piston for urging the latter toward the inner end wall of the housing, said piston having a bore therethrough through which said rod extends, as well as a sleeve extension fixedly attached thereto through which said rod also extends, abutment means on said rod against which said piston sleeve extension abuts, means air sealing said sleeve extension through the housing inner end wall for reciprocation therethrough, and means for introducing fluid under pressure to the inner end portion of the housing adjacent the inner side of said second piston, for normally holding said piston in position toward said stop means, whereby, upon failure of fluid pressure, said compression spring means abruptly actuates said second piston, thereby moving said operating rod for brake application, said first piston having a considerably lesser outer diameter than the inner diameter of said housing and a circumferential flange extending peripherally therearound spaced inwardly on the first piston from the outer end thereof, the first piston having mounted on its periphery a hollow-centered circumferential packing cup opening toward the outer, pressurized side of said piston, said packing cup, on its inward portion resting on and backed up by a separate circumferential piston bearing mounted on the circumferential flange on the periphery of the piston.

* * * * *